Patented June 14, 1927.

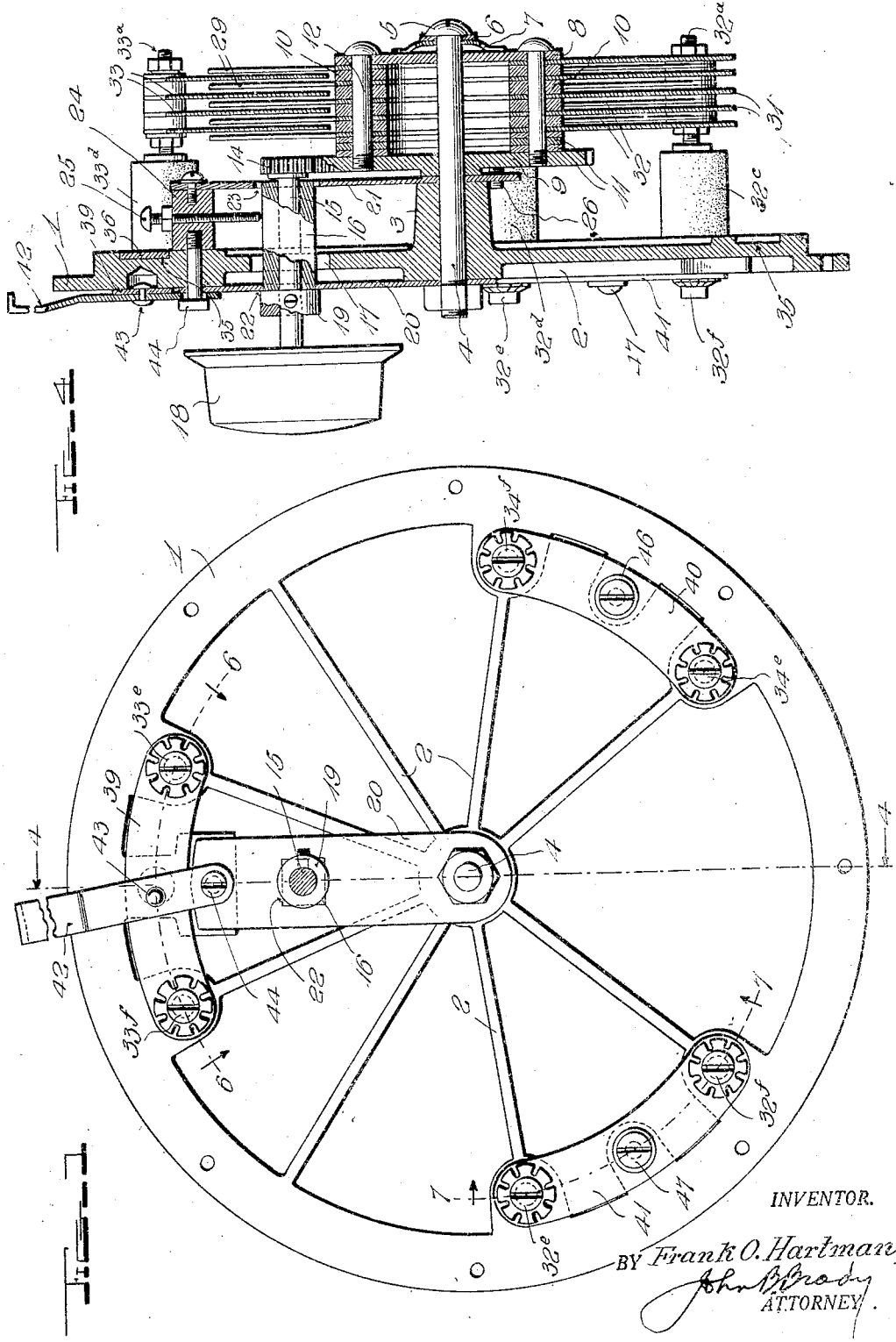

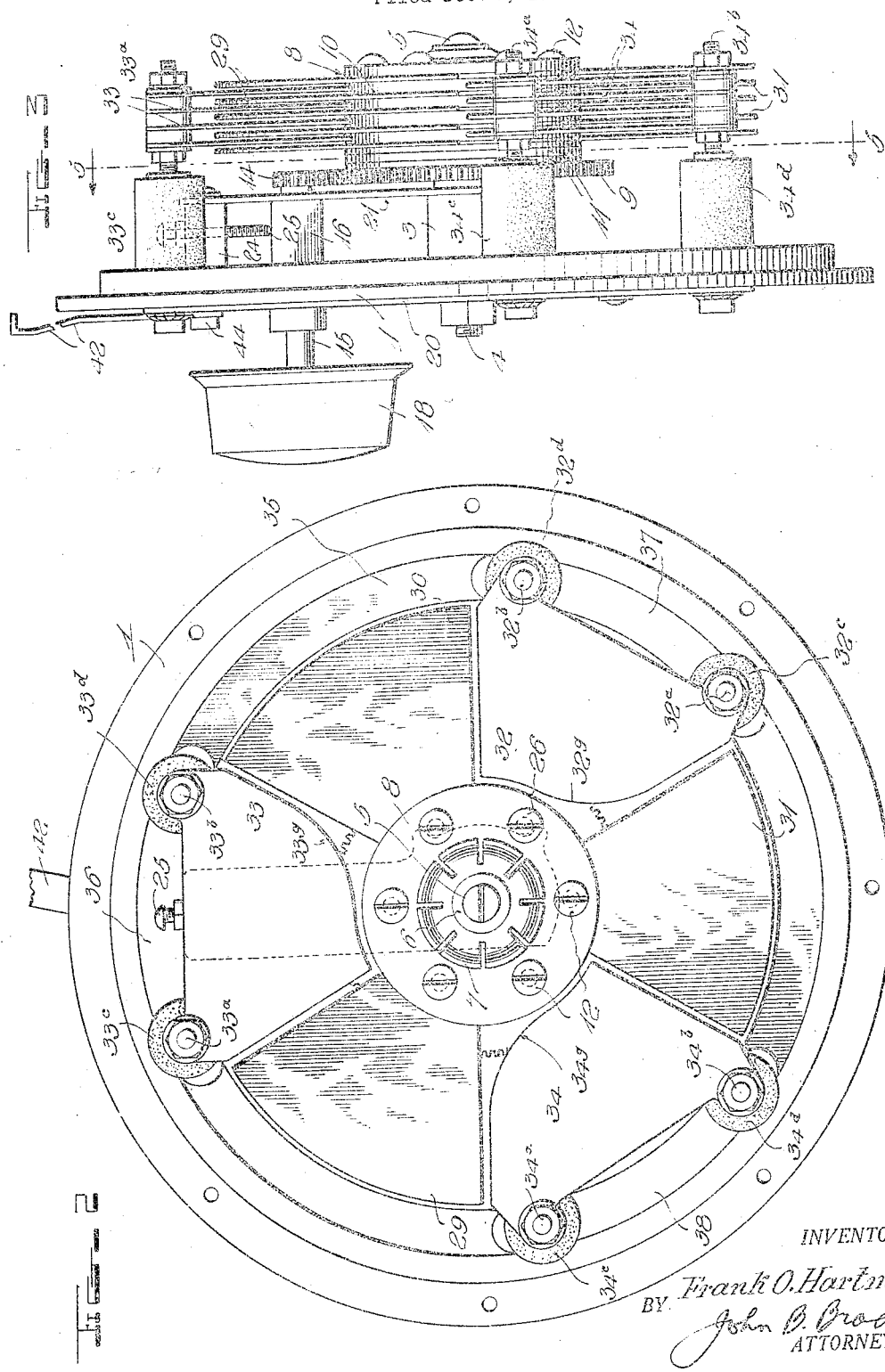

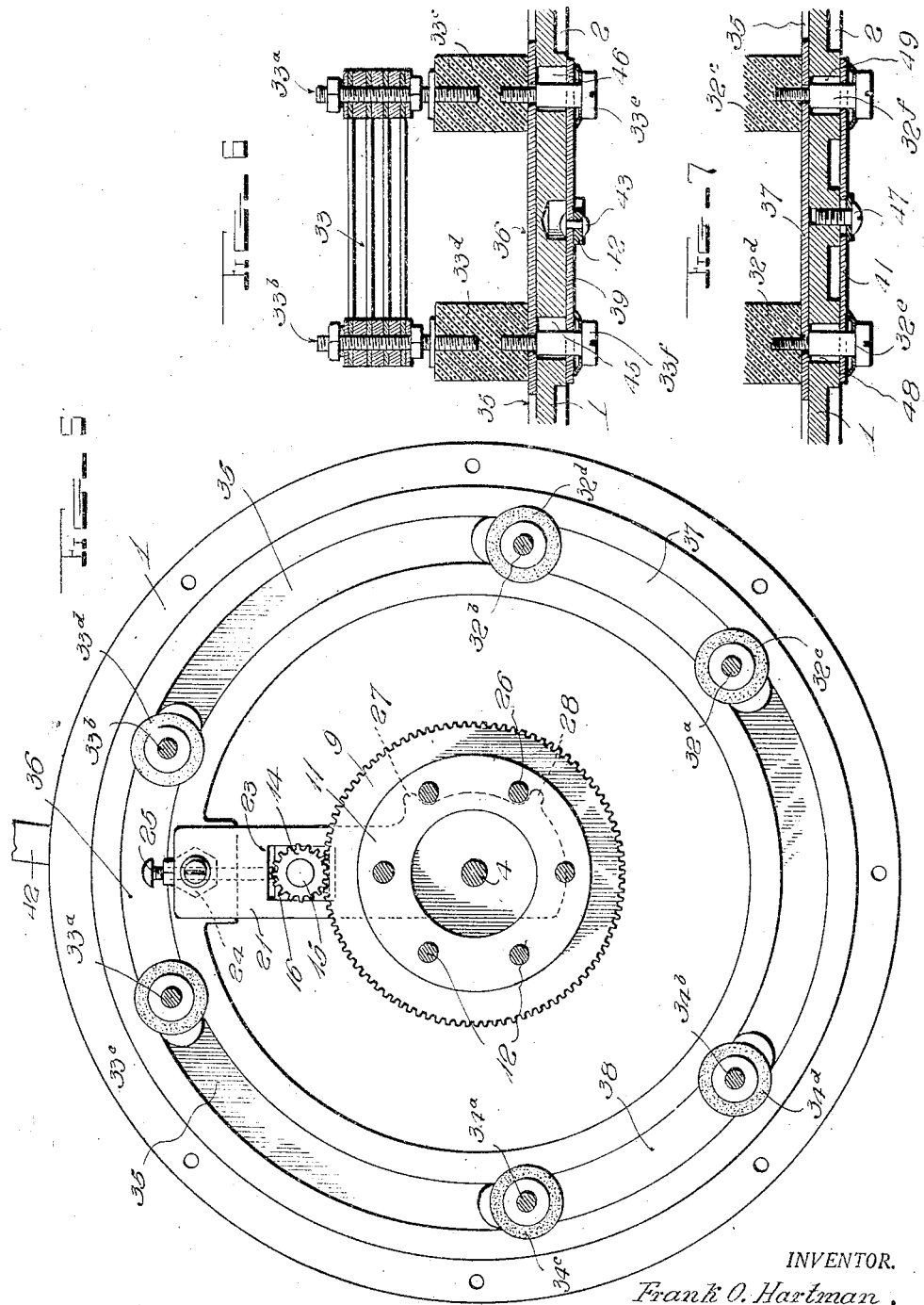

UNITED STATES PATENT OFFICE.

FRANK O. HARTMAN, OF MANSFIELD, OHIO, ASSIGNOR TO HARTMAN ELECTRICAL MANUFACTURING COMPANY, OF MANSFIELD, OHIO, A CORPORATION OF OHIO.

VARIABLE CONDENSER.

Application filed December 8, 1925. Serial No. 74,156.

My invention relates broadly to electrical tuning apparatus and more particularly to a construction of variable condenser for controlling a plurality of electrical circuits simultaneously.

One of the objects of my invention is to provide a construction of multiple variable condenser in which a plurality of sets of rotor plates are arranged to cooperate with a plurality of independent sets of stator plates, the stator plates being supported upon a base with means for adjusting the position of the sets of stator plates upon the base for compensating for differences in the electrical circuits which the apparatus is arranged to control.

Another object of my invention is to provide a construction of multiple variable condenser in which a supporting plate member is provided with a track portion in which sets of stator plates may be adjusted in position with respect to sets of rotor plates which are driven from a common shaft, the sets of stator plates being independently adjustable for compensating for variations in the capacity of the electrical circuits which the variable condenser is arranged to control.

Still another object of my invention is to provide mechanical means for initially adjusting the position of sets of stator plates upon a common supporting member to cooperate with sets of rotor plates in such manner that the differences in capacity between the several sets of stator and rotor plates may be compensated for by shifting the position of the sets of stator plates.

A further object of my invention is to construct a multiple variable condenser in such manner that sets of stator plates may be shifted circumferentially around a common rotor carrying sets of rotor plates arranged to be interleaved in varying degrees with the sets of stator plates for compensating for differences in the electrical capacity of circuits in which the sets of stator and rotor plates may be connected.

My invention finds particular application as a single control tuning system for multi-stage electron tube radio frequency amplifiers where the input circuits of a plurality of tubes may be adjusted simultaneously under control of a single rotatable member. I desire that it be understood however that the variable condenser construction of my invention may be utilized in a number of different types of circuits and that my invention is not limited to the application of the variable condenser construction as a tuning unit in a radio broadcast receiver apparatus.

My invention will be more clearly understood from the specification hereinafter following by reference to the accompanying drawings, wherein:

Figure 1 is a front view of the support which carries the sets of stator plates in the variable condenser construction; Fig. 2 is a rear view of the variable condenser construction of my invention showing the mounting of the sets of stator plates in an annular track in the rear of the supporting plate member; Fig. 3 is a side elevation of the multiple variable condenser of my invention; Fig. 4 is a cross-sectional view taken through the multiple variable condenser on line 4—4 of Fig. 1 with the bearing for the control shaft shown partially in side elevation; Fig. 5 is a cross-sectional view taken through the variable condenser construction on line 5—5 of Fig. 3; Fig. 6 is a detail view of the mounting of one of the sets of stator plates on line 6—6 of Fig. 1; and Fig. 7 is a fragmentary cross-sectional view taken on line 7—7 of Fig. 1 showing the mounting of another of the sets of stator plates in the multiple variable condenser.

In a radio receiving system in which my invention may be applied a radio frequency amplifier is generally employed having a plurality of independently tuned circuits and it is usual to adjust each of the circuits independently for securing proper resonance for the frequency of the incoming signaling energy. By my invention I provide a tuning element by which all of the several independently tunable circuits may be tuned simultaneously by operation of a single control. I provide a mounting for a plurality of sets of stator plates into which a plurality of sets of rotor plates may interleave with the sets of stator plates so arranged on the mounting that they may be independently adjusted in position with respect to the sets of rotor plates so that differences in the electrical capacity existing in the several associated circuits may be compensated for by shifting the position of the sets of stator plates with respect to the sets of rotor plates. The sets of stator plates are initially placed in selected positions by factory test of the apparatus after which the proper relationship of the physical positions of the sets of stator and rotor plates is determined and simultaneous tuning may be secured.

Referring to the drawings in more detail reference character 1 represents the supporting plate on which the parts of the multiple variable condenser are mounted. The supporting plate may be a circular casting as shown having radial strengthening ribs or fins 2 with a bushing member extending centrally from the rear of the plate as represented at 3. The bushing member forms a means of support for the central screw member 4 which extends perpendicular to the plane of the supporting plate 1. A head 5 is provided on the member 4 with a washer member 6 secured thereunder and a resilient bearing plate 7 fastened under the washer member 6 engaging with the rear plate 8 of the rotor. The rotor comprises sets of laterally projecting plates 29, 30 and 31 which are spaced from each other by means of flat spacing members 10 and secured together in a stack by means of bolt members 12 having their ends secured in plate 9 toothed at its periphery in the form of a gear. The sets of rotor plates are spaced from the gear 9 by means of washer members 11. The rotor is driven by means of a pinion 14 engaging the teeth of the gear member 9. The pinion 14 is carried by a shaft 15 which is journaled in a bearing member 16. The bearing member 16 is in the form of a rectangular block fitting in an aperture 22 in a spacing strip 20 and passing through an elongated aperture 23 in an opposite spacing strip 21. A bushing member 19 is secured to the rotatable shaft 15 and abuts against the ends of the bearing member 16. A knob 18 is provided for rotatably driving the shaft 15. A block member 24 is secured by screw member 44 to the supporting plate 1, the screw member 44 passing through an aperture in the spacing strip 20. The block member 24 provides an end support for the spacing strip 21 by which the operating parts of the driving system are positively centered. The block member 24 is provided with an adjusting screw 25 passing therethrough and engaging the bearing member 16 for properly fixing the engagement between pinion 14 and gear 9. The supporting plate 1 is provided with an annular track 35 cast into the plate and adjustably positioned around the track 35 I provide curved strip members 36, 37 and 38 forming individual supports for the sets of stator plates 32, 33 and 34. The set of stator plates 32 is mounted upon bolt members 32$^a$ and 32$^b$ which are embedded in insulated bushings 32$^c$ and 32$^d$, the bushings being spaced by a curved strip-like member 37 which fits within the annular track 35. A strip-like member 41 curved in a manner similar to the curvature of the strip-like member 37 is provided on the opposite side of the supporting plate 1 with screw members 32$^e$ and 32$^f$ passing through the supporting plate 1 and into the insulated bushings 32$^d$ and 32$^c$. The heads of the screw members 32$^e$ and 32$^f$ rest against resilient washers engaging the face of the curved strip-like member 41. The supporting plate 1 is provided with elongated apertures 48 and 49 in which the screw members 32$^e$ and 32$^f$ may be laterally shifted in either direction by loosening the screw member 47 permitting the curved strip-like members 37 and 41 to be moved around the annular track 35 to a position at which the sets of rotor plates are properly interleaved with the corresponding sets of stator plates.

The set of stator plates 33 is carried by bolt members 33$^a$ and 33$^b$ which are embedded in insulated bushings 33$^c$ and 33$^d$. The bushings 33$^c$ and 33$^d$ are spaced apart by means of curved strip 36 which slides within the annular track 35 to cooperate with a similar curved strip 39 on the opposite side of the supporting plate 1. Screw members 33$^e$ and 33$^f$ pass through elongated apertures 46 and 45 in the supporting plate 1 enabling the set of stator plates 33 to be shifted in position. A lever 42 is fulcrumed at a point adjacent the end of the spacing strip 20. The lever 42 has its end pivotally mounted at screw member 44 and has a pivotal connection 43 with the curved strip-like member 39 whereby the complete set of stator plates 33 can be shifted in position in either direction when the set is initially calibrated or compensated for differences in electrical capacity in the several circuits under factory adjustment.

The set of stator plates 34 is mounted in position on bolt members 34$^a$ and 34$^b$ and embedded in bushings 34$^c$ and 34$^d$ spaced apart on the curved strip member 38 slidable in the annular track 35. On the opposite side of the supporting plate 1 there is provided a curved strip 40 which may be shifted circumferentially by reason of screw members 34$^e$ and 34$^f$ which are shiftable in elongated apertures in the supporting plate 1 in a manner similar to the mounting for the sets of stator plates 32 and 33.

The stator plates may be given any desired shape as has been represented by the peripheral curves 32$^x$, 33$^x$ and 34$^x$ for securing capacity variation in accordance with any desired law. The spacing strip 21 is provided with a pair of lug members 27 and 28 which form limiting stops for the projecting member 26 controlling the rotation thereof through an angle corresponding to the width of the sets of stator plates.

It will be understood that the mounting of the stator plates by which the stator plates may be shifted in position is intended for factory adjustment. That is to say the sets of stator plates 32 and 34 are shifted in either direction about the annular track 35 by loosening the screw members 46 and 47 and the sets of stator plates shifted while testing the tuning conditions under operation of the sets of rotor plates. The position of the set of stator plates 33 however may be varied by the operator of the receiving apparatus after installation of the apparatus for matching up the receiver for a particular antenna installation. That is to say the stator plates 33 are connected in the primary tuning circuit of the receiver and the lever 42 provided for shifting the position of the set of stator plates 33 for allowing the circuits to be compensated for inherent differences.

After having once matched the receiver to the antenna installation and maintaining the factory adjustment of the other sets of stator plates constant, simultaneous control of the several circuits of the receiver may be secured under the rotative movement of control knob 18.

While I have described my invention in a certain preferred embodiment I desire that it be understood that modifications may be made in detail without departing from the spirit of my invention and that I intend no limitations upon the invention except as may be imposed by the scope of the appended claims.

What I claim and desire to secure by Letters Patent of the United States is as follows:—

1. In a multiple variable condenser, the combination of a supporting plate, sets of rotor plates journaled for rotative movement on said supporting plate, independent sets of stator plates arranged to cooperate with each of said sets of rotor plates, said sets of stator plates being shiftable in position on said supporting plate around the journal of said rotor plates as a center whereby said sets of rotor plates enter said sets of stator plates in differing positions.

2. A multiple variable condenser comprising in combination a supporting panel, a plurality of sets of rotor plates mounted for rotative movement with respect to said panel, a plurality of movable carriers mounted upon said panel, a plurality of sets of stator plates supported by each of said carriers and arranged to cooperate with said sets of rotor plates, said sets of stator plates being shiftable on said carriers within a circular path for varying the positions at which the sets of rotor plates enter the cooperating sets of stator plates.

3. In a multiple variable condenser for controlling a plurality of electrical circuits simultaneously, the combination of a multiple number of sets of rotor plates, a corresponding number of sets of stator plates for cooperating with said sets of rotor plates, individual carriers for each of said sets of stator plates, said sets of stator plates being slidably mounted on said carriers with respect to said sets of rotor plates for adjusting the relative positions in which said sets of rotor plates enter said sets of stator plates.

4. In a multiple variable condenser for controlling a plurality of electrical circuits simultaneously, the combination of a multiple number of sets of rotor plates, a corresponding number of sets of stator plates for cooperating with said sets of rotor plates, individual supports for each of said sets of stator plates, said sets of stator plates being shiftable in either direction around the axis of said rotor plates on said individual supports for adjusting the relative positions in which said sets of rotor plates enter said sets of stator plates.

5. In a multiple variable condenser for controlling a plurality of electrical circuits simultaneously, the combination of a multiple number of sets of rotor plates, a corresponding number of sets of stator plates for cooperating with said sets of rotor plates, a supporting plate common to both of said sets of rotor and stator plates, and means on said supporting plate for advancing or retreating each of said sets of stator plates with respect to each of said sets of rotor plates for fixing the relative positions at which said sets of rotor plates enter said stator plates.

6. In a multiple variable condenser for controlling a plurality of electrical circuits simultaneously, the combination of a multiple number of sets of rotor plates, a corresponding number of sets of stator plates for cooperating with said sets of rotor plates, a supporting plate common to both said sets of rotor and stator plates, and individual plate members on said supporting plate for slidably mounting each of said sets of stator plates with respect to said sets of rotor plates whereby the position of said sets of stator plates may be independently fixed with respect to the entrance therein of cooperating sets of rotor plates.

7. In a multiple variable condenser for controlling a plurality of electrical circuits simultaneously, the combination of a multiple number of sets of rotor plates, a corresponding number of sets of stator plates for cooperating with said sets of rotor plates, a supporting plate common to both said sets of rotor and stator plates, an annular track on said supporting plate and means carried by each of said sets of stator plates slidably positioned in said annular track whereby said sets of stator plates may be shifted in position with respect to the position at which said sets of rotor plates enter said sets of stator plates.

8. In a multiple variable condenser for controlling a plurality of electrical circuits simultaneously, the combination of a multiple number of sets of rotor plates, a corresponding number of sets of stator plates for cooperating with said sets of rotor plates, a supporting plate common to both said sets of rotor and stator plates, an annular track on said supporting plate and independent arcuate shaped members slidably positioned in said annular track, each of said arcuate shaped members carrying one of said sets of stator plates whereby said sets of stator plates may be shifted in position with respect to each of said sets of rotor plates.

In testimony whereof I affix my signature.

FRANK O. HARTMAN.